Dec. 16, 1969 MAMORU KURIYAGAWA ET AL 3,484,566

DISC RECORDING SYSTEM WITH PRECOMPENSATION
BY SUCCESSIVE DIFFERENTIATION

Filed May 19, 1965 5 Sheets-Sheet 1

United States Patent Office 3,484,566
Patented Dec. 16, 1969

3,484,566

DISC RECORDING SYSTEM WITH PRECOMPENSATION BY SUCCESSIVE DIFFERENTIATION

Mamoru Kuriyagawa, Kamakura-shi, Motoi Yagi, Zushi-shi, and Motokazu Ohkawa, Yokohama-shi, Japan, assignors to Tokyo Shibaura Electric Co., Ltd., Kawasaki-shi, Japan, a corporation of Japan Filed May 19, 1965, Ser. No. 457,126
Claims priority, application Germany, Jan. 21, 1965, T 27,859
Int. Cl. G11b 3/64
U.S. Cl. 179—100.4 10 Claims

ABSTRACT OF THE DISCLOSURE

To compensate for variation in width of a cut recording groove, as the stylus vibrates laterally and eliminate tracing distortion by overcoming the pinch effect, vertical compensating signals are added to the signals so that, upon reproduction, the round reproducing stylus will always ride in the groove at the same level; these compensating signals are obtained by twice differentiating the original signals. A sec. $\theta$—1 signal is obtained in a function generator, and a $\sin^2 \theta$ signal in a second function generator, where $\theta$ is defined as the angle of the tangent of the recording groove, at any instant, with respect to the direction of recording. The compensating signals are mixed with the original signal.

This invention relates to disc recording systems and more particularly to means of adding auxiliary signals to the original signal to be mechanically recorded.

In the art of disc recording, the cutting stylus used for mechanical recording has been shaped to have an acute angle at the tip part, the diagonal edge of which has been used for cutting the groove.

Because the shape of the tip part of the reproducing needle is round, the position of the regenerating needle cannot exactly coincide with that of the acute-angled cutting stylus.

Due to the differences between the shape of the tip of the recording, that is cutting stylus and of the reproducing needle, distortion, usually called tracing distortion, results.

It is an object of the present invention to eliminate the above referred to tracing distortion in order to regenerate original signals with high fidelity.

Other objects will become apparent from the specification:

SUBJECT MATTER OF THE PRESENT INVENTION

Briefly, in accordance with the present invention, means are provided to compensate for variation in width of a cut recording groove, as the stylus vibrates laterally. Vertical compensating signals are added to the tracing signals so that, upon reproduction, the round reproducing stylus will always ride in the groove at the same level. These compensating signals are obtained by twice differentiating the original signals. A sec. $\theta$—1 signal is obtained in a function generator; a $\sin^2 \theta$ signal is obtained in a second function generator. These signals are mixed in with the original signals. The angle $\theta$ is defined as the angle of the tangent of the recording groove, at any instant, with respect to the direction of recording.

The invention will be more fully understood from the following detailed description of the drawings in which.

Figures 3, 8, 9, 10:
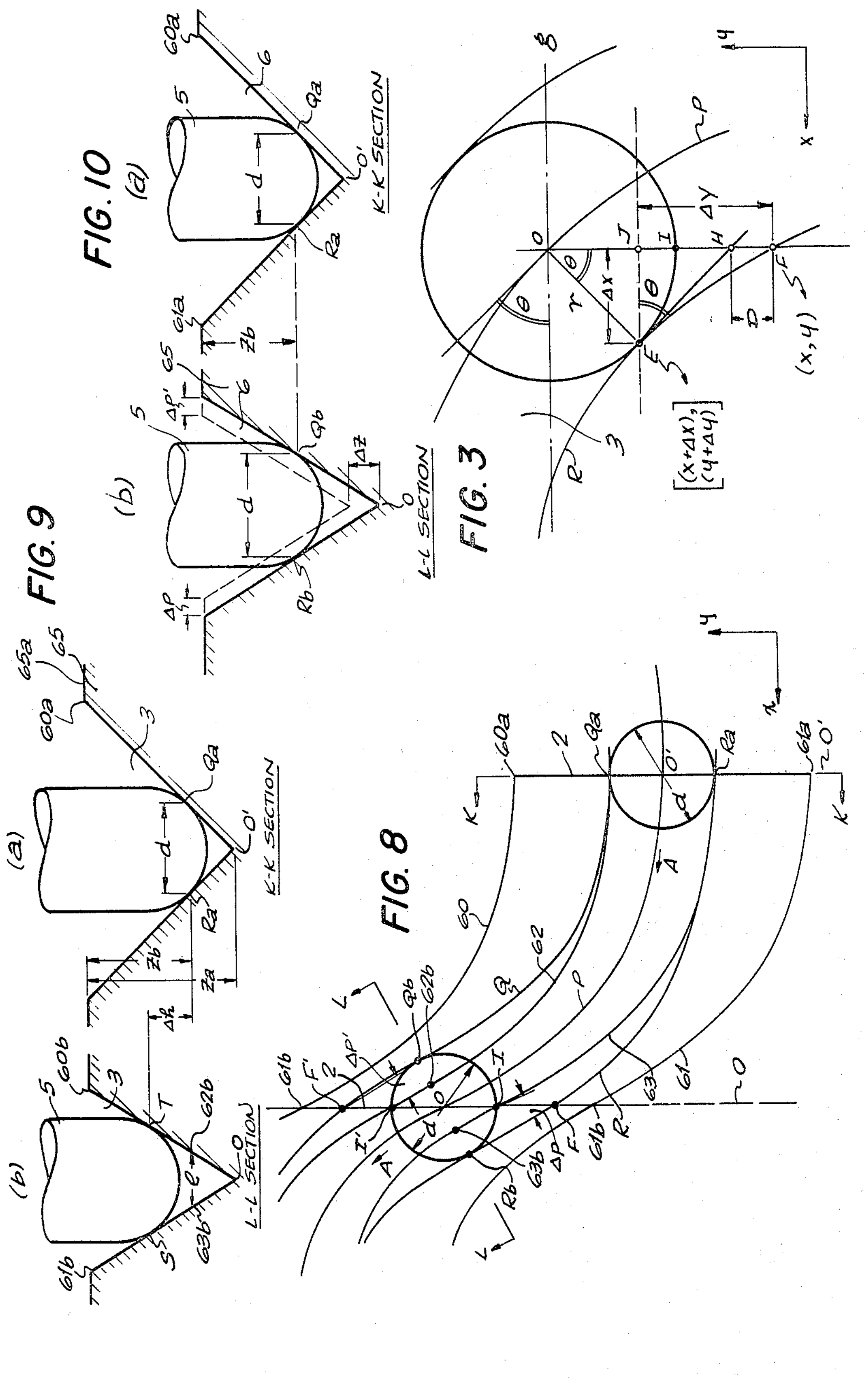
FIG. 3 is a diagram which explains the auxiliary or compensating signal according to this invention.
FIG. 8 illustrates the path, in a graphic form, of cutters taken at various elevations and is a composite of the illustration of FIG. 1 to a larger scale, and FIG. 3.

FIG. 9, in two sections (*a*) and (*b*) illustrates the position of a cutting stylus in a groove, illustration (*a*) corresponding to section K—K and point O′ of FIG. 8 and the illustration (*b*) corresponding to section L—L, and point O of FIG. 8; and FIG. 10, in two diagrams (*a*) and (*b*) illustrates the position of the cutting stylus when cutting with the compensating signals of the present invention, the diagrams (*a*) and (*b*) corresponding again to section K—K and L—L of FIG. 8, respectively.

Figure 1:
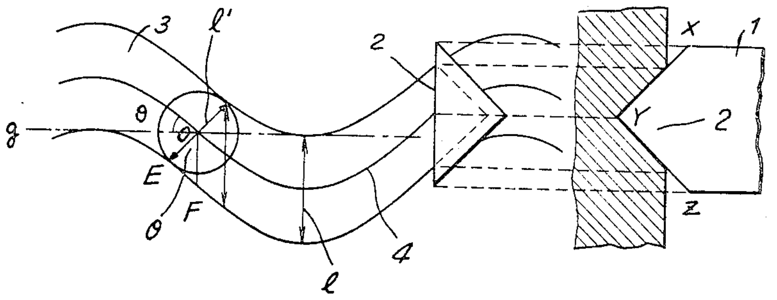
FIG. 1 shows a partially enlarged recorded groove made in accordance with the prior art by scraping, without addition of auxiliary signals.

Referring now to FIG. 1, it is seen that the width of the cut groove 3 varies along the length of the groove because the direction of the edge 2 of cutting stylus 1 is always fixed while the groove undulates. The edge 2 is the part actually cutting the groove into the disc and has a width 1. The cutting stylus-edge 1 is driven by a signal of wave form 4; the groove 3 then reaches the maximum value 1 when the gradient of the original signal wave 4 is zero, the width of the groove 3 reaches the minimum value 1′ when the gradient of the original signal wave 4 is a maximum.

Accordingly, the round-shaped reproducing needle thus moves up and down, that is, its movement includes a vertical component, if a recording disc cut as above is used for reproduction.

This kind of undesirable vertical component of needle movement can be compensated, by cutting the groove 3 more deeply where the groove is less wide.

When edge 2 (FIG. 8) of a cutting stylus 1 cuts a recording disc 65, the cutting stylus 1 is moved in the direction of arrow A along a curve P representing a signal waveform to be recorded, so as to cut groove 3 of a determinded depth $Za$ in the recording disc 65. In this case, the cutting stylus edge 2 is driven to always move in parallel with the direction of tangents (in the direction of the $x$-axis) drawn at respective points on concentric circles around the axis of rotation of the recording disc 65.

Since the stylus edge 2 is moved parallel to the $x$-axis along the curve P, the width of the groove 3 will be narrower as an angle between the curve P and the $x$-axis becomes greater. As seen in FIG. 8, the width of the groove 3 at a point O—see FIG. 9(*b*)—is narrower than that of the same at a point O′—compare FIG. 9(*a*).

Consequently, when a reproducing needle 5 (FIGS. 9 and 10) slides in the cut groove 3 in the direction of A, the playback needle 5 will be lifted higher at the point O by $\Delta h$, with respect to point O′, as illustrated in FIG. 9. The groove width at a depth $Zb$ from surface **65*a* of the disc 65** is equal to $d$ at the point of O′ (FIG. 9*a*); at the point O, the groove width is $e$ (FIG. 9*b*). The width at the depth along the signal curve P can be continuously designated by a width between curves 62 and 63 in FIG. 8. As the inclination of the signal curve P with respect to $x$-axis becomes sharper, the groove width at the depth $Zb$ will be smaller, which results in raising the reproducing needle 5. This has been termed pinch effect.

When the needle 5 is raised, a signal reproducing apparatus (not shown) will pick up a distortion signal corresponding to the height by which the needle 5 is raised.

To overcome such distortion, the reproducing needle 5 should be kept at a constant level. The groove thus must be cut in such a manner that the cutting stylus 1 can ride lower by $\Delta Z$ as shown in FIG. 10(*b*). A compensated groove 6 will then have a constant width of *d* everywhere along the curve P. Curves Q and R in FIG. 8 illustrate that the groove 6 is always of the constant width *d* at the depth $Zb$.

Controlling the cutting stylus 1 to cut deeper by $\Delta Z$ will result in a sound groove 6 which will be wider by $\Delta P+\Delta P'$ ($\overline{IF}+\overline{I'F'}$ in FIG. 8, represented in the direction of $y$-axis). The quantity $\overline{IF}$ is equivalent to the amount of compensation.

Figure 2:
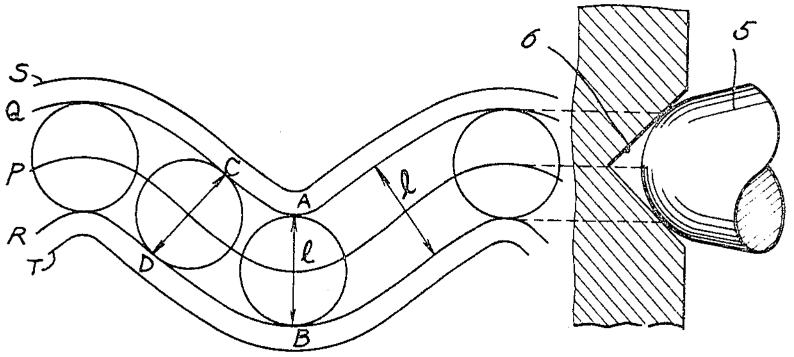
FIG. 2 is a view similar to FIG. 1 but according to this invention.

An advantage by this invention is seen in FIG. 2, indicating a groove of uniform width at a given height (lines R and Q) cut by the stylus edges XY and XZ during the cutting operation. Lines S and T indicate the top of the cut groove, line P the center, which corresponds to the original signal 4. Derivation of the compensating signal will be explained in connection with FIG. 3, in which curve EF is part of curve R of FIG. 8 and the $x$-axis is taken to be positive to the left for ease of illustration. This compensating signal is proportional to the absolute value of speed of the original signal wave. The cutting stylus-edge becomes maximum at a point O in the drawing and assuming $\overline{OF}=\overline{OE}$ sec. $\theta$, if the angle between the moving direction of the cutting stylus-edge 2 and the center line $g$ is defined to be $\theta$. First order compensation which is adequate in actual practice, is realized, by this invention, by varying the depth of the cut, based on variation of cutting speed and of $\theta$ so that $\overline{OE}$ will approximate $\overline{OH}$.

The amount by this compensation is $$\overline{OF}-\overline{OE}\cong\overline{OH}-\overline{OE}$$
$$=\overline{OE}\text{ sec. }\theta-\overline{OE}=\overline{OE}\text{ (sec. }\theta-1) \qquad (1)$$

On the groove thus compensated, $\overline{AB}\cong\overline{CD}$ as is shown in FIG. 2.

In order to scrape the $\overline{OE}$ portion of the groove with a linear cutting stylus-edge 1, as is shown in FIG. 1, $\overline{OE}$ must be compensated at least by this amount $\overline{OE}$ (sec. $\theta-1$).

The second important compensation corrects the error which appears due to the assumption that the line connecting E and F is linear. The variation of the difference of distance between the real $\overline{EF}$ curve and line OF may, however, be parabolic. The distance E–J, denoted $x$ (FIG. 3) parallel to line $g$ of the center line between the point E and F, is $r\cdot\sin\theta$, where $r$ means the radius of the circle O.

Accordingly, assuming a parabolic curve, the additional necessary compensation $\overline{HF}=D$, is $$\overline{HF}=D=kx^2=kr^2\sin^2\theta \qquad (2)$$

where $k$ means the curvature of $\overline{EF}$.

It can be shown mathematicaly that these compensations include higher order terms. Industrially desirable compensation is almost entirely achieved by the first and the second compensations described.

Figure 4:
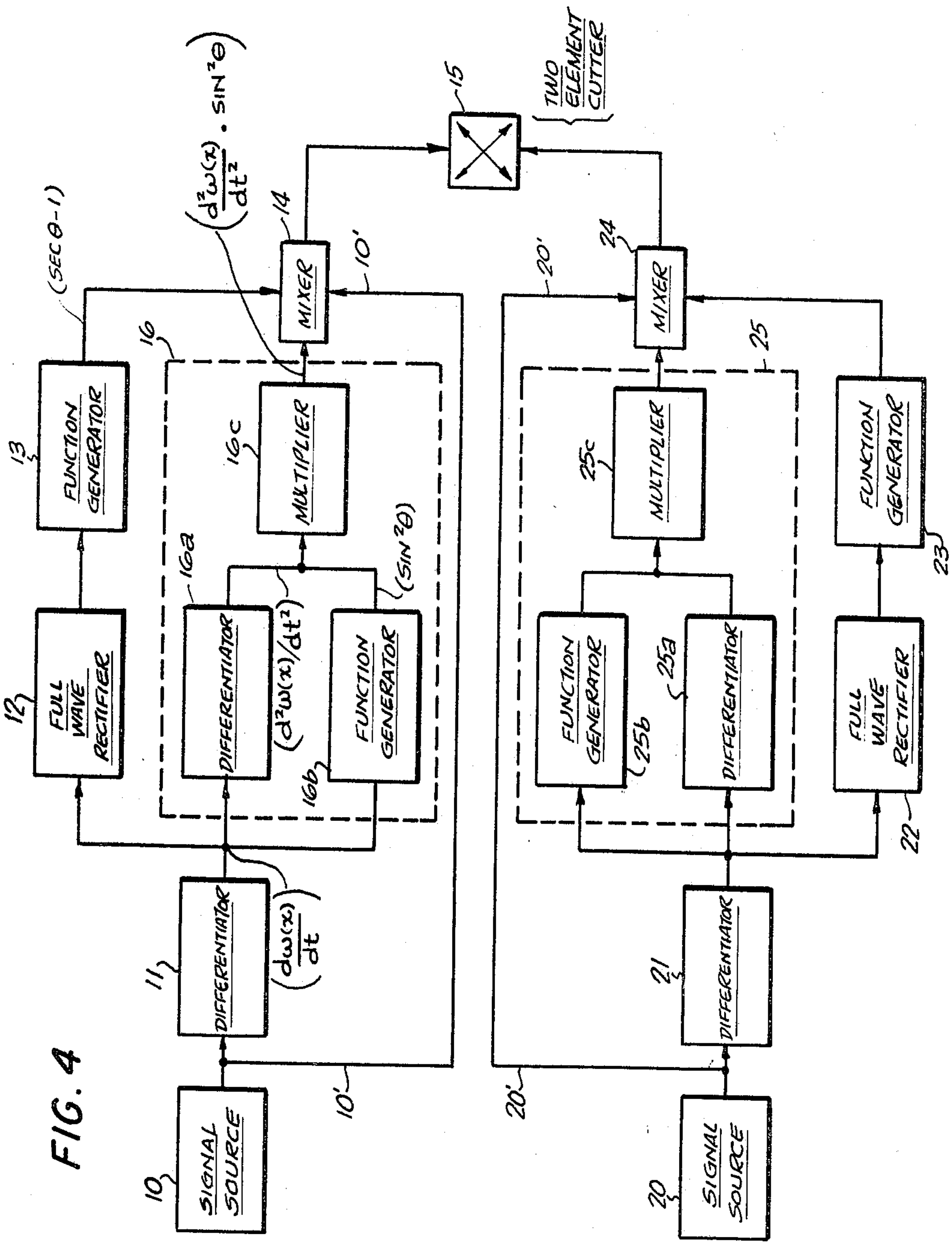
FIG. 4 is a block circuit diagram according to this invention.

FIG. 4 shows a circuit diagram of the invention, in which the input signal is an amplitude variable signal. The signals from signal source 10 are led to a differentiator circuit 11, by which a signal is obtained the amplitude of which varies according to the variation of speed of distance $x$, and thus of angle $\theta$. From this signal an absolute value independent of the polarity of speed variation is obtained by means of full-wave rectification by a full-wave rectifier 12. This amplitude signal having an absolute value is amplified by a function generator 13, which may be an amplifier having non-linear amplification characteristics approximating the function sec. $\theta-1$ as closely as possible. The curve of sec. $\theta-1$ being approximately of the square character, the usual vacuum-tube amplifier can simply be used. The network preferably is so arranged that the signal output varies with distance of the stylus from the center of the disc.

The output signal of this amplifier 13 corresponds to the first compensating signal already described. This compensating signal is mixed with the original signal applied over a line 10' by a mixer 14 and its output signal is made to be one input of a two-element cutter 15.

To provide for the second kind of compensation, the output of the above differentiator 11 is supplied to a function generator 16 for the second compensating signals comprising a differentiator **16*a*, a function generator 16*b* and a multiplier 16*c* and its output is applied to the above mixer 14**.

Likewise, a signal generated by the signal source 20 is applied through a differentiator 21, a full wave rectifier 22, a function generator 23 to a mixer 24, and a signal from differentiator 21 to a function generator 25, with similar components as function generator 16 to provide the second compensating signal. The original signal is applied to mixer 24 over line 20'. The construction of these elements is similar to that described already, supplied to the other input of the above two-element cutter 15.

The circuit of FIG. 4 is described for stereophonic signals, one channel each for a signal. For monophonic recording, the signal is inverted, and the direct, and inverted signals are applied to the two branches of the circuit, the outputs of each circuit system being impressed to each input of the two-element cutter respectively. In the latter case, however, the respective phase of the signals impressed to each two-element cutter will thus be inverted.

Figures 5, 6:
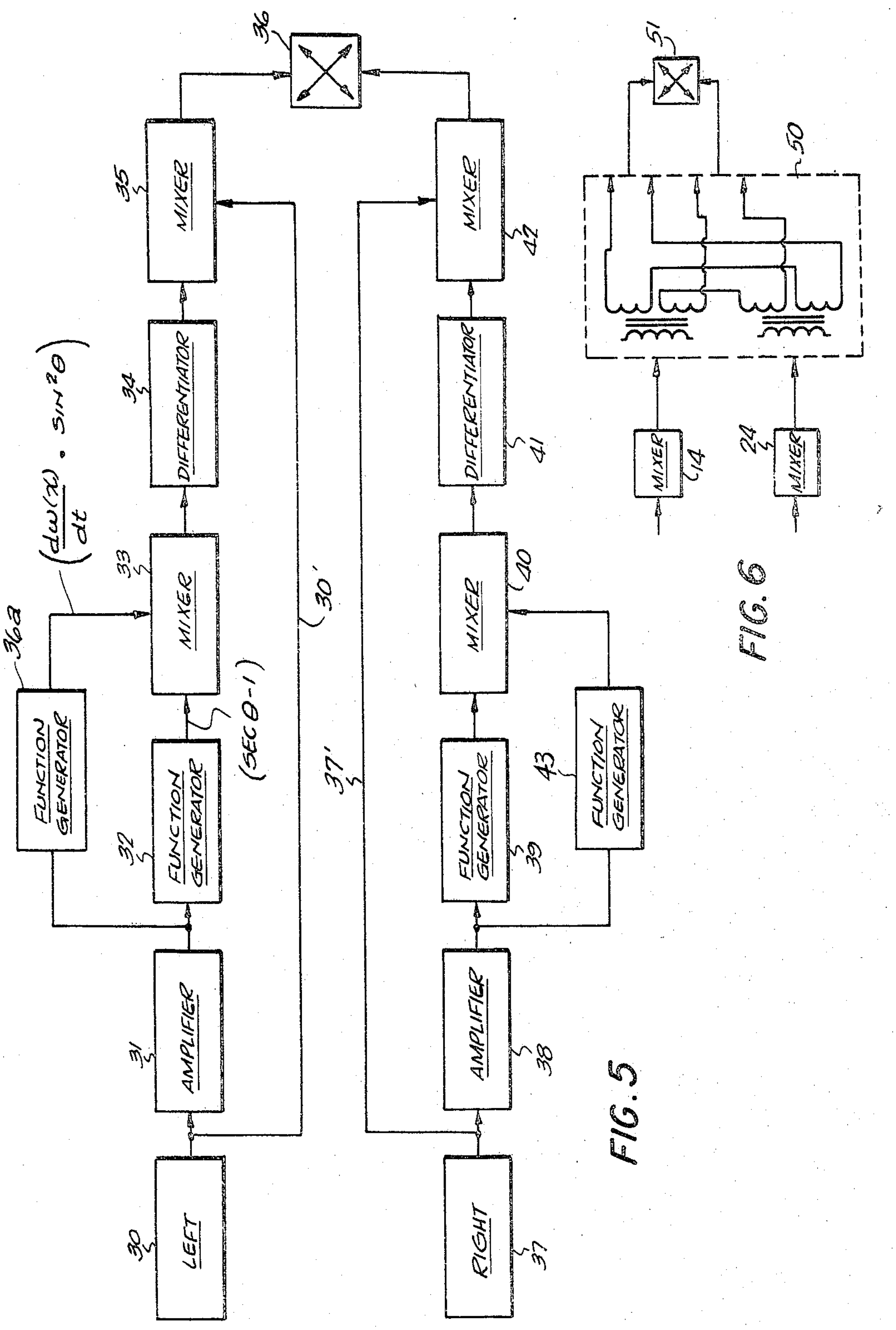
FIG. 5 is another embodiment of the circuit diagram, in block form, in accordance with this invention.
FIG. 6 is a partial, detail circuit diagram in accordance with this invention.

In case the signal at the input is a frequency variable signal, the embodiment of FIG. 5 is used.

In case of stereo recording, a "left" signal generated by a signal source 30 is fed through an amplifier 31 and led to a function generator 32 which generates a function of approximately sec. $\theta-1$, to obtain the first compensating signals. This kind of compensating signals is fed through a mixer 33 and a differentiator 34 to a mixer 35 where it is mixed with the above original signal over line 30', and is impressed to one input of a two-element cutter 36.

For the second compensation the output of the above amplifier 31 is branched, through another function generator network **36*a* for the second compensating signal comprising a differentiator, a function generator and a multiplier, and mixed with the above second compensating signals, so that the signal impressed onto the two-element cutter 36 is a signal in which the first and second compensating signals are mixed. The "right" signal obtained from a signal source 37 is connected through a system just as described above comprising an amplifier 38, a function generator 39, a mixer 40, a differentiator 41, a connection 37', a mixer 42 and a function generator network 43 for the second compensating signal and impressed unto another input of the two-element cutter 36**.

This embodiment of the invention can, of course, be applied to monophonic recording in the same manner as described above.

The above described embodiment of the invention is suitable when the cutters are symmetrical so that the signals must be similar. If that is not the case, then each cutter input must be modified by transforming the output signals of the mixers 14, 24 (or 35, 42, respectively) using a transformer 50 (FIG. 6).

It is also possible, in accordance with the invention, to provide for compensation by adding only the first compensation or both the first and second compensations to other signals, appearing in recording apparatus.

Figure 7:
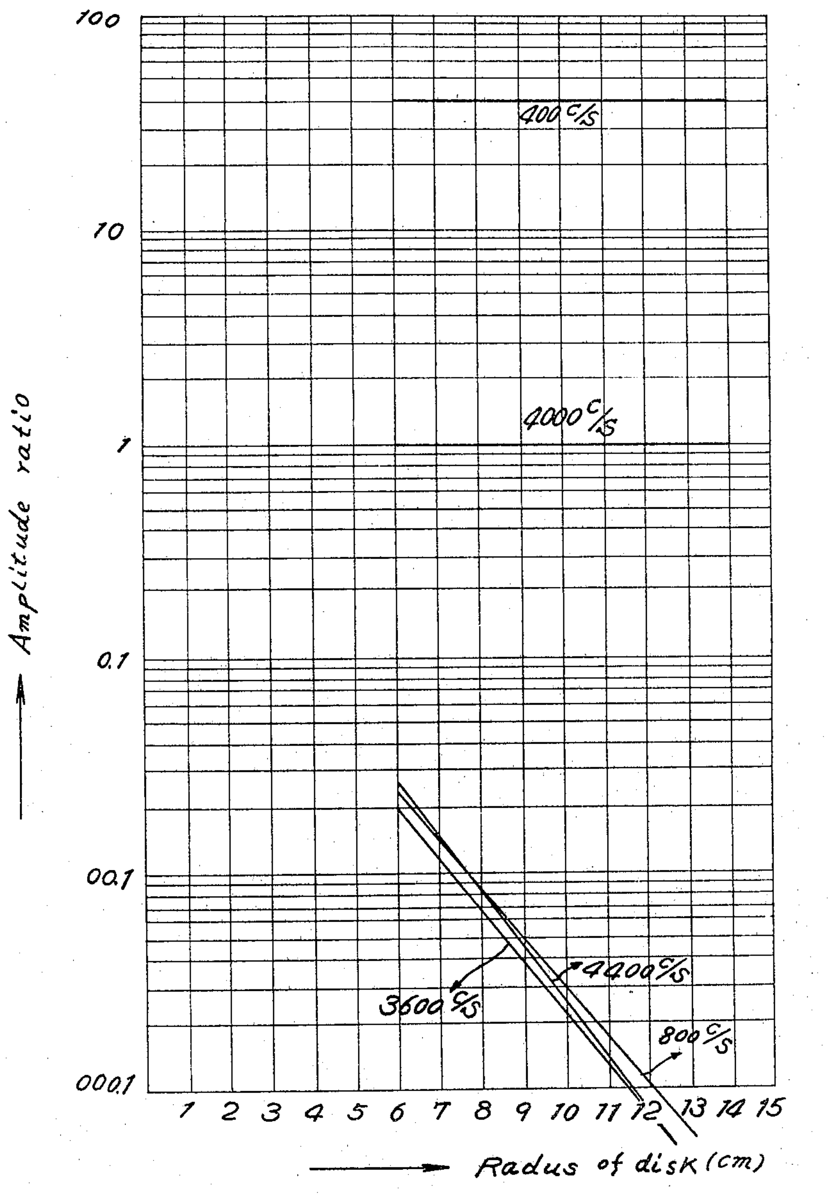
FIG. 7 is a graph illustrating and comparing the effect of a new system according to this invention with that of the past art.

FIG. 7 illustrates experimental results.

The data show sound-reproduction characteristics of a disc recorded at 6.22 cm./sec. maximum in which a 4,000 Hz. signal is modulated by a 400 Hz. signal using the 45°—45° recording system; the abscissa represents radius of tested disc and the ordinate represents amplitude ratio of recorded signal.

According to the data, it is obvious that the distortion is very low, which is also verified by listening tests.

The tracing distortion could not be discovered by ear even for a recorded signal of about 3 db higher in power level than that previously. Further, wear of the recorded grooves decreased even after frequent playing .

In addition, reproduction with high fidelity was possible even if a pick-up had high mechanical impedance because the groove varies in width only in the horizontal direction, eliminating vertical excursions of the pick-up.

Moreover, reproduction of high fidelity was possible even of complex signals for example noisy music or applause etc., because the shapes of the cut grooves on the discs are simplified; and the manufacture, particularly of separation of the matrix from disc and of both plating and reshaping is facilitated.

What is claimed is:

1. A disc recording system to cut grooves with a stylus to record original signals on the disc comprising a first differentiating means connected to the signals to differentiate said signals;

a first function generator means having the differentiated signals applied thereto and transforming said signals in accordance with a predetermined function, to provide first compensating signals;

second function generator means including means for re-differentiating the differentiated signals obtained by said first differentiating means, said second function generator means producing a second compensating signal;

and mixer means applying a composite of said original signals and both said first and second compensating signals to said stylus to cut grooves on a surface of the recording disc in accordance with said composite of said original signals and both said compensating signals.

2. Recording system according to claim 1 wherein said second function generator means further includes a multiplier circuit and a further function generator circuit connected to said re-differentiating means and having a combined signal transfer function producing said second compensating signals, said transfer function being proportional to the square of the sine of an angle $\theta$, wherein $\theta$ is the angle of the tangent of the recorded groove, at any instant, with respect to the direction of recording.

3. Recording system according to claim 1 wherein the transfer function of said first function generator means provides an output in accordance with the relationship: sec. $\theta-1$, where $\theta$ is the angle of the tangent of the recorded groove, at any instant, with respect to the direction of recording.

4. Recording system to cut a record with a pair of original signals, wherein a pair, each, of similar systems in accordance with claim 1 are provided to supply a pair of composite signals, one each for a two-element cutting means.

5. A disc recording system according to claim 2 wherein said original signals to be recorded are the "left" and "right" signals for stereophonic recording.

6. A disc recording system according to claim 2 wherein one signal of the pair of signals is the original signal of a monaural recording, and the other signal of the pair is said original signal with inverted phase.

7. A disc recording system according to claim 1 wherein the said second function generator means includes a circuit having an exponential function transfer characteristic and connected to convert signals applied thereto from the first differentiating means into compensative signals as modified by said exponential function.

8. A record disc cutting system for recording signals from a source and having a cutting stylus, a signal channel from said source to said stylus, and means eliminating tracing distortion, said tracing distortion eliminating means comprising first function generator means connected in said channel and generating a first compensating signal in accordance with the function sec. $\theta-1$, where $\theta$ is the angle of the tangent of the recorded groove, at any instant, as determined by the signal to be recorded, with respect to the direction of recording;

a differentiating network connected in said channel;

second function generator means connected in said channel and providing a second compensating signal, said second function generator means comprising a second differentiator, an additional function generator and a multiplier, said network having a combined transfer function of $k \sin^2 \theta$, where $k$ represents the curvature of the groove to be recorded;

and mixing circuit means, connected in said channel and mixing said original signals and said first and second compensating signals and said differentiated signals to obtain a composite signal, said composite signal being applied to said stylus to adjust the depth of cut as the applied signal controls the stylus to move with respect to the direction of recording.

9. System according to claim 8 wherein the differentiating network is connected to said source and has its output applied to said first function generator means and to said second function generator means.

10. System according to claim 8 wherein the differentiating network is connected to have the composite output of said first function generator means and said second function generator means applied thereto;

and said mixing circuit means includes a mixing circuit connected to mix the original signal from said source with the differentiated composite signal and to apply said mixed signal to said stylus.

References Cited

UNITED STATES PATENTS

| | | | |
|---|---|---|---|
| 2,310,049 | 2/1943 | Albersheim | 274—38 |
| 3,403,233 | 9/1968 | Cooper | 179—100.4 |

FOREIGN PATENTS

| | | |
|---|---|---|
| 388,819 | 3/1933 | Great Britain. |
| 1,027,897 | 4/1958 | Germany. |

OTHER REFERENCES

Redlich and Klemp, A New Method of Disc Recording for Reproduction With Reduced Distortion: The Tracing Simulator, April 1965, Jour. of the Audio Eng. Soc., vol. 13, No. 2, pp. 111–118.

BERNARD KONICK, Primary Examiner

RAYMOND F. CARDILLO, Jr., Assistant Examiner